United States Patent
Modi et al.

(10) Patent No.: US 10,223,911 B2
(45) Date of Patent: Mar. 5, 2019

(54) VIDEO DATA AND GIS MAPPING FOR TRAFFIC MONITORING, EVENT DETECTION AND CHANGE PREDICTION

(71) Applicant: Echelon Corporation, Santa Clara, CA (US)

(72) Inventors: Sohrab Modi, Oakland, CA (US); Shalender Singh, Milpitas, CA (US)

(73) Assignee: Echelon Corporation, Santa Clara, CA (US)

( * ) Notice: Subject to any disclaimer, the term of this patent is extended or adjusted under 35 U.S.C. 154(b) by 158 days.

(21) Appl. No.: 15/338,633

(22) Filed: Oct. 31, 2016

(65) Prior Publication Data

US 2018/0122231 A1    May 3, 2018

(51) Int. Cl.
*G08G 1/01*    (2006.01)
*H04W 4/00*    (2018.01)
(Continued)

(52) U.S. Cl.
CPC ..... *G08G 1/0145* (2013.01); *G06F 17/30061* (2013.01); *G06F 17/3084* (2013.01);
(Continued)

(58) Field of Classification Search
CPC .... G08G 1/0145; G08G 1/048; G08G 1/0129; G08G 1/04; G08G 1/095; G08G 1/08;
(Continued)

(56) References Cited

U.S. PATENT DOCUMENTS 3,685,012 A    8/1972    Case et al.
4,847,772 A    7/1989    Michalopoulos et al.
(Continued)

FOREIGN PATENT DOCUMENTS

EP    2 700 032    3/2016
KR    20100086089    7/2010
(Continued)

OTHER PUBLICATIONS

International Search Report and Written Opinion for International Application No. PCT/US17/58938 dated Mar. 7, 2018.
(Continued)

*Primary Examiner* — Brian P Sweeney
(74) *Attorney, Agent, or Firm* — Locke Lord LLP

(57) ABSTRACT

A distributed system for traffic monitoring and event detection includes a plurality of video units within viewing distance of a thoroughfare to be monitored. Each video unit processes a video stream while monitoring events at the thoroughfare, identifies and analyzes events, encodes traffic meta data characterizing the analysis, and transmits the meta data to a central controller. The central controller stores a geographic map representing the thoroughfare, correlates the meta data received from the video units, and forms a composite representation of the geographic map and the correlated meta data. The central controller replays previously stored composite representations of the geographic map and the correlated meta data, which were monitored under mutually different event conditions. The central controller is also configured to allow changes to previously stored composite representations of the geographic map and to the correlated meta data for the purpose of understanding the impact of change.

12 Claims, 13 Drawing Sheets

(51) Int. Cl.

| | | |
|---|---|---|
| *H04L 29/08* | (2006.01) | |
| *H04W 64/00* | (2009.01) | |
| *G08G 1/04* | (2006.01) | |
| *G08G 1/048* | (2006.01) | |
| *G08G 1/095* | (2006.01) | |
| *G06F 17/30* | (2006.01) | |
| *H04W 4/70* | (2018.01) | |
| *H04W 4/80* | (2018.01) | |
| *G08G 1/08* | (2006.01) | |
| *H04W 84/04* | (2009.01) | |
| *H04W 84/12* | (2009.01) | |

(52) U.S. Cl.
CPC ..... *G06F 17/30241* (2013.01); *G08G 1/0116* (2013.01); *G08G 1/0129* (2013.01); *G08G 1/0133* (2013.01); *G08G 1/04* (2013.01); *G08G 1/048* (2013.01); *G08G 1/08* (2013.01); *G08G 1/095* (2013.01); *H04L 67/12* (2013.01); *H04L 67/22* (2013.01); *H04W 4/70* (2018.02); *H04W 4/80* (2018.02); *H04W 64/006* (2013.01); *H04W 84/042* (2013.01); *H04W 84/12* (2013.01)

(58) Field of Classification Search
CPC ............... G08G 1/0116; G08G 1/0133; G06F 17/30061; G06F 17/30241; G06F 17/3084; H04W 4/80; H04W 64/006; H04W 4/70; H04W 84/042; H04W 84/12; H04L 67/12; H04L 67/22
USPC ........................................................ 701/117
See application file for complete search history.

(56) References Cited

U.S. PATENT DOCUMENTS

| | | | |
|---|---|---|---|
| 5,341,435 A | 8/1994 | Corbett et al. | |
| 6,466,862 B1 | 10/2002 | DeKock et al. | |
| 6,697,104 B1 | 2/2004 | Yakobi et al. | |
| 7,123,166 B1 | 10/2006 | Haynes et al. | |
| 7,460,691 B2 | 12/2008 | Ng et al. | |
| 7,541,943 B2 | 6/2009 | Manor | |
| 7,868,912 B2 | 1/2011 | Venetianer et al. | |
| 7,869,935 B2 | 1/2011 | Ma et al. | |
| 7,932,923 B2 | 4/2011 | Lipton et al. | |
| 8,334,906 B2 | 12/2012 | Lipton et al. | |
| 8,339,454 B1 | 12/2012 | Maali | |
| 8,358,357 B2 | 1/2013 | Jannard et al. | |
| 8,358,808 B2 | 1/2013 | Malinovskiy et al. | |
| 8,520,069 B2 | 8/2013 | Haler | |
| 8,564,661 B2 | 10/2013 | Lipton et al. | |
| 9,159,228 B2 | 10/2015 | Wang et al. | |
| 9,172,433 B2 | 10/2015 | Schwager | |
| 2005/0129280 A1* | 6/2005 | Chujoh | G08G 1/04 382/104 |
| 2005/0146605 A1 | 7/2005 | Lipton et al. | |
| 2006/0227862 A1 | 10/2006 | Campbell et al. | |
| 2011/0095908 A1 | 4/2011 | Nadeem et al. | |
| 2011/0205086 A1 | 8/2011 | Lamprecht et al. | |
| 2011/0246210 A1* | 10/2011 | Matsur | G06Q 10/06 705/1.1 |
| 2013/0113932 A1 | 5/2013 | Lipton et al. | |
| 2013/0268654 A1 | 10/2013 | Abraham et al. | |
| 2013/0332058 A1* | 12/2013 | Prestor | G08G 1/0962 701/118 |
| 2014/0046874 A1 | 2/2014 | Li et al. | |
| 2014/0249742 A1 | 9/2014 | Krivacic et al. | |
| 2014/0267734 A1 | 9/2014 | Hart et al. | |
| 2016/0094399 A1 | 3/2016 | Kish | |
| 2016/0125246 A1 | 5/2016 | Ryhorchuk et al. | |
| 2016/0127749 A1 | 5/2016 | Chowdhury et al. | |
| 2016/0300489 A1 | 10/2016 | Shafran | |

FOREIGN PATENT DOCUMENTS

| | | |
|---|---|---|
| WO | WO 2013151414 | 10/2013 |
| WO | WO 2013187748 | 12/2013 |
| WO | WO 2015009640 | 1/2015 |
| WO | WO 2016048428 | 3/2016 |

OTHER PUBLICATIONS

Lei, Manchun, et al. "A video-based real-time vehicle counting system using adaptive background method." Signal Image Technology and Internet Based Systems, 2008. SITIS'08. IEEE International Conference on. IEEE, 2008.

Hsieh, Jun-Wei, et al. "Automatic traffic surveillance system for vehicle tracking and classification." IEEE Transactions on Intelligent Transportation Systems 7.2 (2006): 175-187.

Salvi, Guiseppe. "An automated vehicle counting system based on blob analysis for traffic surveillance." Proceedings of the International Conference on Image Processing, Computer Vision, and Pattern Recognition (IPCV). The Steering Committee of The World Congress in Computer Science, Computer Engineering and Applied Computing (WorldComp), 2012.

* cited by examiner

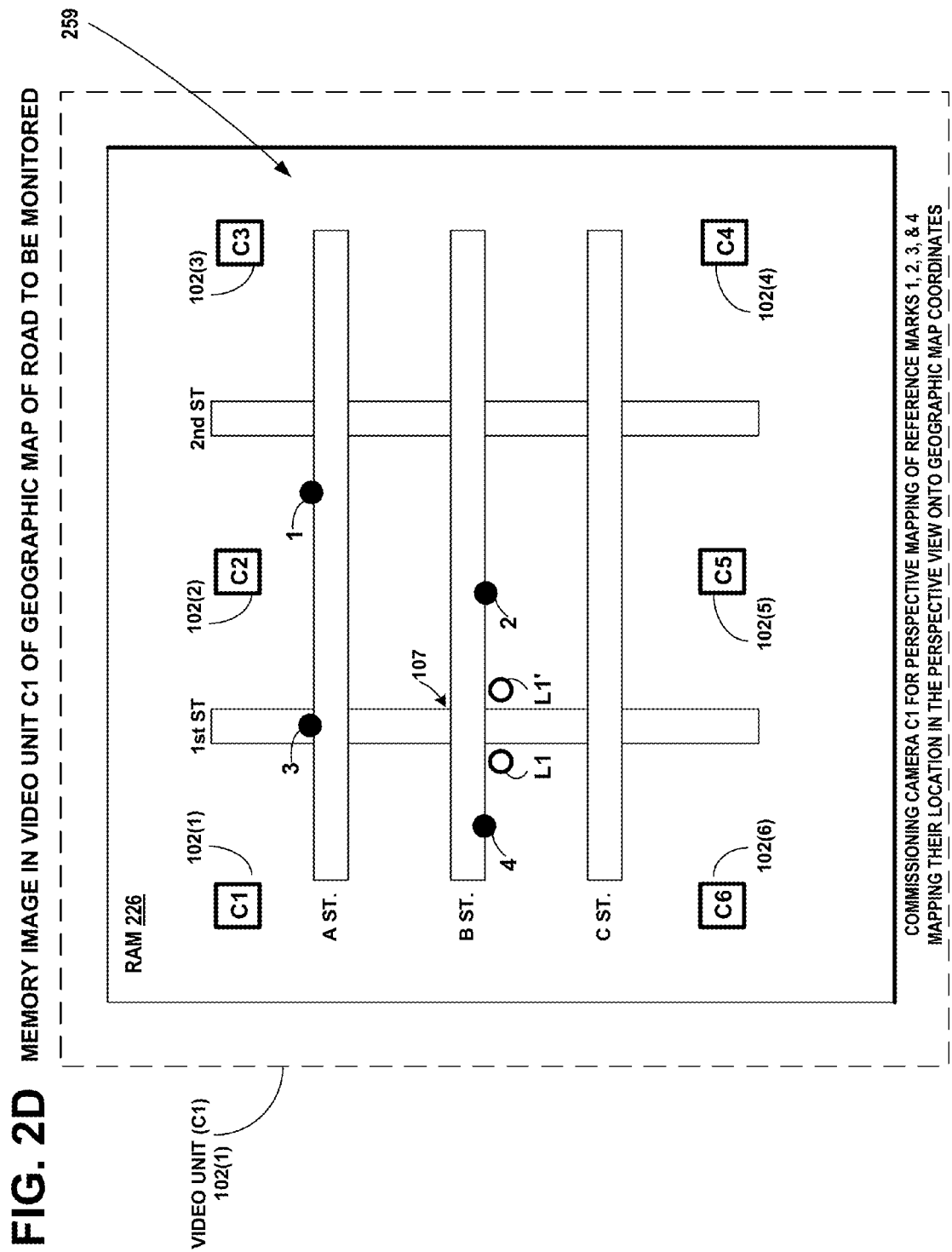
FIG. 2D  MEMORY IMAGE IN VIDEO UNIT C1 OF GEOGRAPHIC MAP OF ROAD TO BE MONITORED

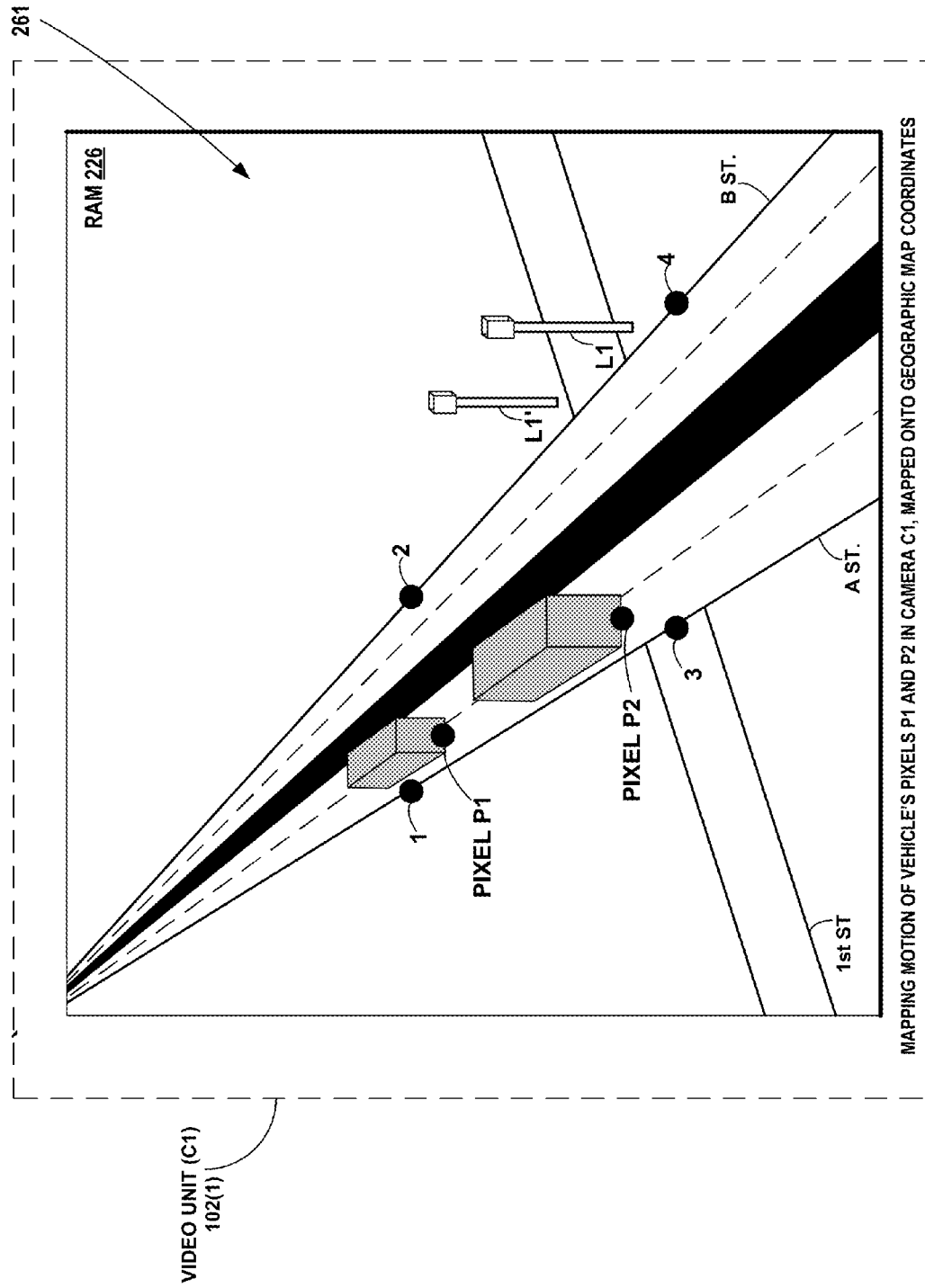
FIG. 2E  MEMORY IMAGE IN VIDEO UNIT C1 OF PERSPECTIVE VIEW OF VEHICLE BEING MONITORED

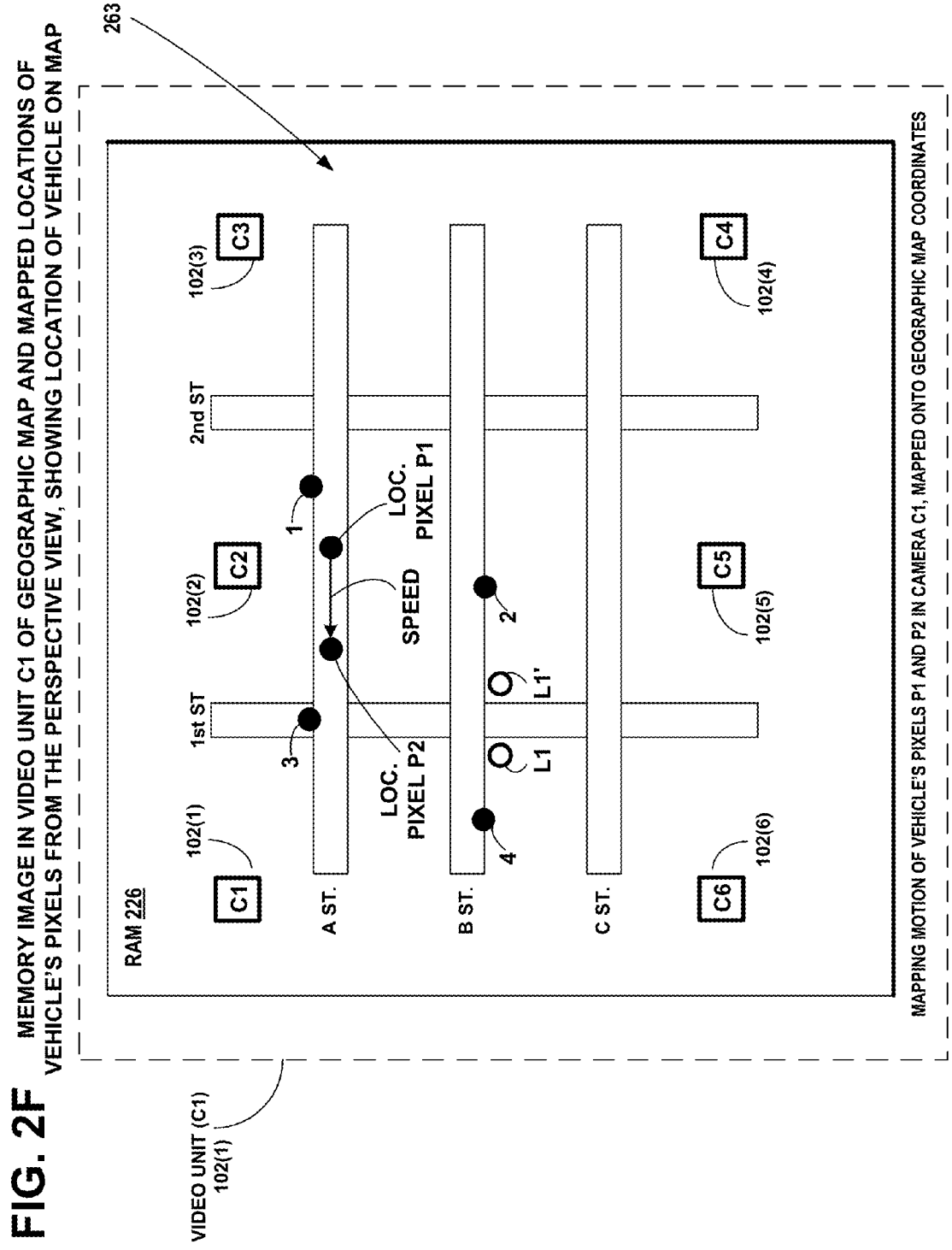

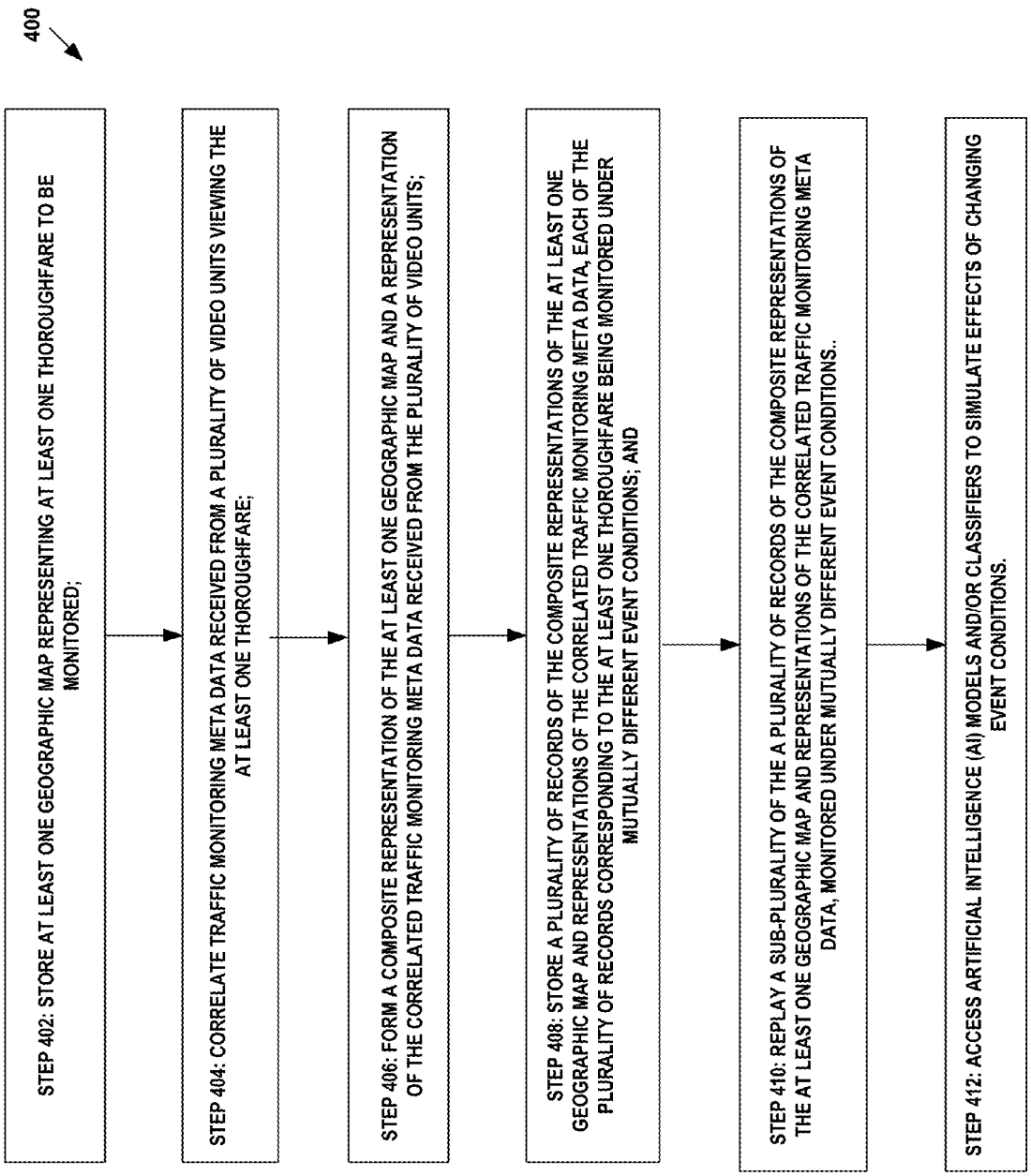

VIDEO DATA AND GIS MAPPING FOR TRAFFIC MONITORING, EVENT DETECTION AND CHANGE PREDICTION

FIELD OF THE INVENTION

The invention disclosed broadly relates to capturing traffic activity, and more particularly relates to employing traffic monitoring and event detection data to drive activity replays or simulations over Geographic Information System (GIS) maps for improved traffic behavior insight and the ability to understand the impact of changes.

BACKGROUND OF THE INVENTION

The ability to monitor traffic is important for many business and government reasons. One especially important reason is to acquire underlying data necessary to understand human behavior when driving vehicles and the relationships between drivers and between drivers and the environment and both. The ultimate aim of data collection is allow analysis via replays or utilize other understanding approaches that enable subsequent improvements resulting in smoothing the flow of goods and services, expedite emergency vehicles and, in general, improve the quality of human life. The ability to monitor for, detect and report accurate information about events is essential for policy-makers, traffic managers and drivers alike. In this regard, entire systems have been created to respond to this monitoring challenge. But these systems are severely constrained by the massive amounts of monitoring data needed for a complete picture of traffic activity. Today's systems are also hobbled by energy limitations, high costs, inability to effectively search video, inability to correlate multiple data inputs and the limiting reality of constrained multi-hop communications in sensor network deployments. Finally, the biggest problem of all is the inability of these systems to accurately replay traffic events or provide insight into future behavior as environment factors are changed, such as the weather, timing of stop lights, restricting vehicle sizes or widening the road.

The ongoing monitoring problem is the appetite for information is always growing, which is driving technology to evolve from simple scalar traffic counting to more complex traffic classification technology. Smart traffic guidance and management systems for smart cities are being flooded with monitoring data as part of the expanding role of IoT in everyday lives. Counting vehicles, people and things (products on assembly lines, pallets of goods, people in vehicles, types of vehicles, speeds, etc.) is emerging as a key class of "killer applications" that will greatly assist in spreading IoT deployments that monitor and gather data for future traffic applications. Today, the evolution of technology is also driving the desire to move beyond counting to automated monitoring for programmed events to eventually proactive usage that answers questions as to road capacity, what is the best speed limit, how many lanes are needed etc.

Today, it's amazing what a single camera can do with sophisticated traffic analyzing software driven by Artificial Intelligence (AI) algorithms. While AI algorithms have been around for a while they continue to evolve and are getting better at event detection and reporting activities. But the application of AI at the edge of the network in a distributed IoT sensor based environment is new and presents substantial challenges. Due to Moore's Law, processing has become very inexpensive compared to the cost of massive video transmission infrastructures supporting a large and growing number of video feeds. The key problem is to mine the information embedded in the video data where it is captured and to monitor for, and detect events which are programmed into the system, often remotely. Using an event detection approach is much more efficient and compact than needlessly moving raw video data around an energy and capacity constrained network. Instead, because of economic trends it is possible to attach programmable processors to the data collection points to reduce transmitted data volumes and manage the energy needed to power the network sensors/nodes to provide higher monitoring and event detection coverage.

Data collected by today's rudimentary sensor networks have simple scalar forms with less information which makes processing simple (typically simple calculations of addition, subtraction, division, sums, and averages for example are generated). But it is difficult to form a comprehensive understanding of an environment based on simple scalar information. On the other hand, videos and images collected by video sensor networks are rich in information. They are non-lossy and can be analyzed over and over, but have complicated forms. Video can be searched and analyzed in a refined and step wise manner looking for and drilling down into events. Today videos are sometimes compressed and sent to back-end servers for this processing (formatted, integrated, analyzed, etc.) to meet diverse application requirements. But simple compression is not enough for the upcoming flood of future data.

Increasingly, new applications cannot be supported by typical scalar sensor networks because they require vast amounts of information which can only be obtained from an image or video. Scalar data is insufficient for many important applications such as GIS, video surveillance, traffic monitoring and the combination of GIS and traffic monitoring information.

Clearly, the scalar approach of counting the events such as the passage of individual cars is not enough. This approach misses important data such as the relationships between cars, vehicle sizes, closing speeds, acceleration, weather conditions, road conditions etc. In addition, simple scalar data collection will not provide enough information to allow the accurate replaying of traffic activity with all the environment nuances for an end user.

Getting the proper meta data from video feeds is important for future applications that can combine virtual reality and artificial intelligence in the replaying of traffic activities over maps and pictures suitable for not only human consumption but provide the ability to change parameters that are critical to employing proactive traffic management.

The ability to accurately replay traffic events is very important to gauge the efficiency of our transportation infrastructure. But even more important is the ability to provide insight into future performance as behavior patterns and environment factors are changed, such as the weather, increased traffic from a future stadium, timing of stop lights, restricting vehicle sizes or widening the road. The amount of money needed for infrastructure changes is significant and pro-actively making sure the money that is to be spent achieves its intended purpose is paramount.

Due to the lack of flexible sensors, energy requirements, network connectivity and video platforms, there has been little progress on controlling a distributed system of IoT video sensors. Future systems need the flexibility to adjust camera aim, coordinate data from multiple cameras 2D to 3D to managing many camera angles and correlate the video data into a low bit rate data stream that is information rich enough to be useful with GIS applications that allow replay and "what-if" simulation scenarios. The ability to be proactive is hugely important.

SUMMARY OF THE INVENTION

Example embodiments of the invention solve the problem of mining information embedded in video data representing events to be monitored, at the location where the video data has captured a dynamically changing scene, transmitting the mined information as low bandwidth meta data to a central controller, and constructing representations of the monitored events at the server, which may be replayed and modified to analyze or redesign the location.

A distributed system is disclosed for traffic monitoring and event detection. In accordance with an example embodiment of the invention, the system includes a plurality of video units located within viewing distance of at least one thoroughfare to be monitored. Each video unit includes a video camera, video frame processing logic, a processor and memory including computer program code. The video unit is configured to cause the video frame processing logic to process a video stream from at least one video camera while monitoring predefined categories of events at the at least one thoroughfare, to identify traffic monitoring events associated with the at least one thoroughfare, to analyze the traffic monitoring events, and to encode traffic meta data characterizing the analysis of the traffic monitoring events. The at least one video unit includes a communications unit configured to transmit to a central controller the meta data characterizing analysis of the traffic monitoring events.

In accordance with an example embodiment of the invention, the distributed system includes a central controller includes a processor and memory including computer program code. The central controller is configured to store at least one geographic map representing the at least one thoroughfare to be monitored, to cause the controller to correlate the traffic monitoring meta data received from the plurality of video units, and to cause the controller to form a composite representation of the at least one geographic map and a representation of the correlated traffic monitoring meta data received from the plurality of video units. The central controller includes a playback unit configured to replay records of previously stored composite representations of the at least one geographic map and representations of the correlated traffic monitoring meta data, which were monitored under mutually different event conditions.

In accordance with an example embodiment of the invention, the central controller includes an archive storage configured to store a plurality of records of the composite representations of the at least one geographic map and representations of the correlated traffic monitoring meta data; each of the plurality of records corresponding to the at least one thoroughfare being monitored under mutually different event conditions.

In accordance with an example embodiment of the invention, the central controller includes a playback unit configured to replay a sub-plurality of the a plurality of records of the composite representations of the at least one geographic map and representations of the correlated traffic monitoring meta data, monitored under mutually different event conditions.

In accordance with an example embodiment of the invention, the mutually different event conditions include changing timing of traffic lights, replacing lights with roundabouts, changing traffic flows, changing traffic volume, changing traffic direction, widening the road with more lanes, adding another road to spread out traffic, or changing ambient weather conditions.

In accordance with an example embodiment of the invention, the communications unit in the at least one video unit is configured to transmit the low bandwidth event message to the central controller over a communications medium selected from the group consisting of twisted pair, coax cable, Ethernet, Infrared, RFID, WiFi, Bluetooth, Bluetooth Low Energy, ultra narrow band communications protocol from Sigfox, LTE-M, any Low Power Wireless Area Network (LPWAN) protocol, any M2M communication protocol, cellular, IEEE 802.15.4 RF, or LoRa Low Power Wide Area Network. The communications unit in the central controller being configured to receive the low bandwidth event message from the at least one video unit over the communications medium. Example low bandwidth communication links may have a data rate as low as a few Kilo bytes/sec. The example embodiment of the invention, is expected to work over low bandwidth communication links, however it is not restricted to low bandwidth and works over higher bandwidth communication links.

In accordance with an example embodiment of the invention, the communications unit in the at least one video unit being a power line communications unit is configured to transmit a low bandwidth event message over installed power lines to the central controller. The communications unit in the central controller is a power line communications unit, configured to receive the low bandwidth event message over installed power lines from the at least one video unit.

In accordance with an example embodiment of the invention, a sensor is located at the at least one video unit, configured to sense distance and motion of a vehicle, the at least one video unit, configured to prepare a low bandwidth event message representing the vehicle's position and motion sensed by the sensor. The central controller further configured to receive the low bandwidth event message and to track the vehicle as it moves in the thoroughfare.

In accordance with an example embodiment of the invention, a sensor is proximate to the thoroughfare, configured to detect an approach of a vehicle and transmit a signal indicating the approaching vehicle.

In accordance with an example embodiment of the invention, a plurality of video cameras located at the at least one video unit, configured to analyze and combine multiple views of a same event and only send a reduced amount of information to the central controller, the at least one video unit, configured to prepare a low bandwidth event message representing the reduced amount of information.

DESCRIPTION OF THE FIGURES

FIG. 2D illustrates an example embodiment of the invention of FIG. 2C, showing a subsequent step in commissioning the traffic monitoring video camera. The figure shows a memory image in the memory associated with the video camera, of a geographic map of the roadway to be monitored. The figure shows forming a mapping relationship between the identified reference locations in the camera's perspective view of the roadway in FIG. 2C, with geographic coordinates of the geographic map in FIG. 2D, corresponding to the reference locations.

FIG. 2E illustrates an example embodiment of the invention of FIG. 2D, showing an initial step in monitoring vehicle motion using the mapping relationship. The figure shows a memory image in the memory associated with the video camera, of the perspective view of a vehicle moving along the roadway to be monitored. The figure shows mapping the motion of the image of the vehicle, as seen in the camera, mapped onto geographic map coordinates of the moving vehicle on the geographic map.

FIG. 2F illustrates an example embodiment of the invention of FIG. 2E, showing a subsequent step in monitoring the vehicle motion using the mapping relationship. The figure shows a memory image in the memory associated with the video camera, of the geographic map of the roadway with the geographic map coordinates of the moving vehicle. Characteristics of the vehicle's motion, such as its speed, may be derived from its map coordinates.

FIG. 4 illustrates an example embodiment of the invention, showing a system flow diagram of an example the operation of the traffic monitoring system.

DISCUSSION OF THE PREFERRED EMBODIMENTS

Example embodiments of the invention solve the problem of mining information embedded in video data representing events to be monitored, at the location where the video data has captured a dynamically changing scene, transmitting the mined information as low bandwidth meta data to a central controller, and constructing representations of the monitored events at the server, which may be replayed to analyze or redesign the location.

Figure 1:
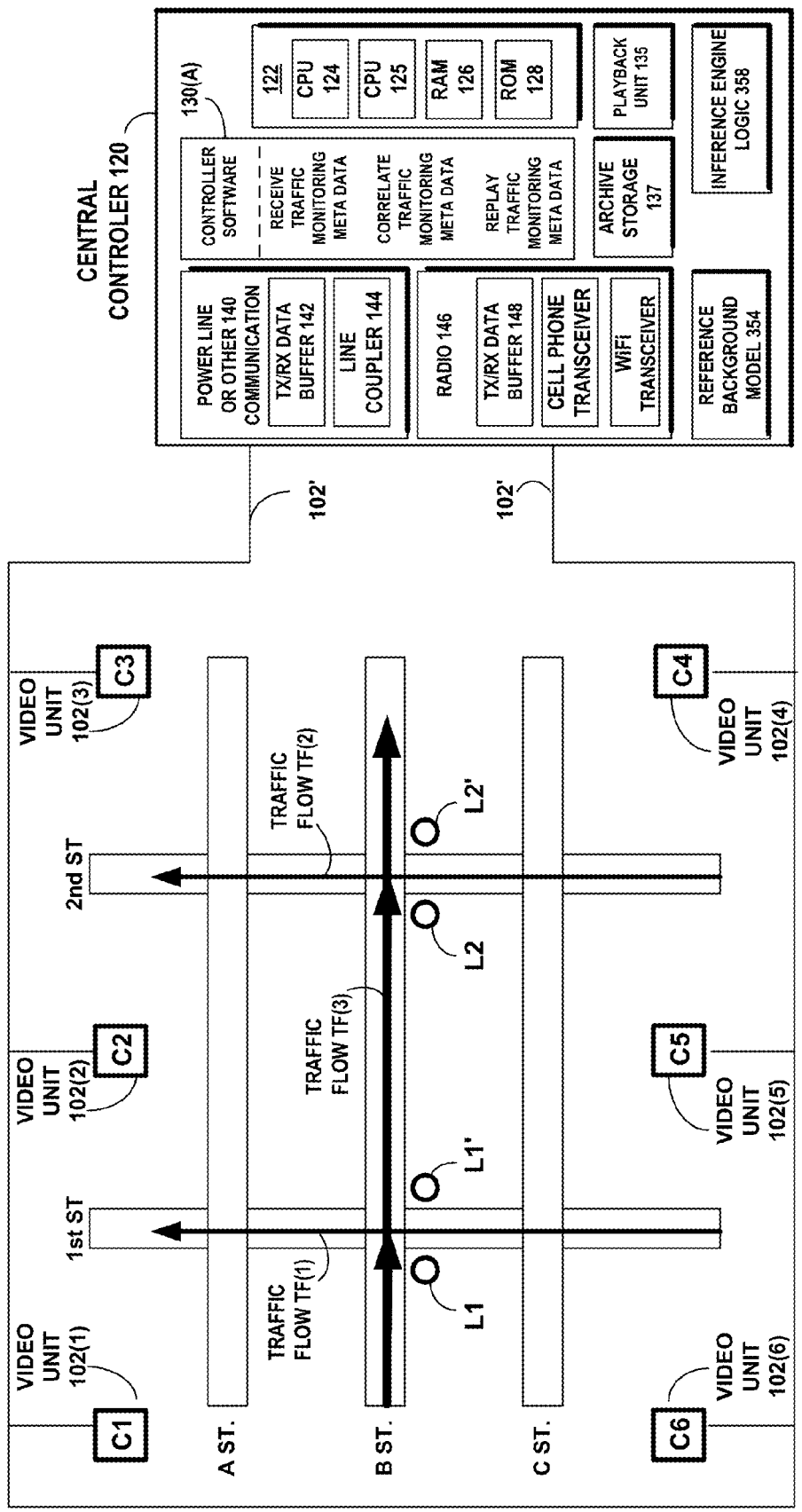
FIG. 1 illustrates an example embodiment of the invention, of a distributed system for traffic monitoring and event detection including a plurality of video units located within viewing distance of at least one thoroughfare to be monitored and a controller configured to correlate the traffic monitoring meta data received from the plurality of video units, and to form a composite representation of at least one geographic map and a representation of the correlated traffic monitoring meta data received from the plurality of video units.

FIG. 1 illustrates an example embodiment of the invention, of a distributed system for traffic monitoring and event detection. The system includes a plurality of video units 102(1) C1, 102(2) C2, 102(3) C3, 102(4) C4, 102(5) C5, and 102(6) C6 located within viewing distance of at least one thoroughfare to be monitored. The thoroughfares shown are the north-south roadways of $1^{st}$ Street and $2^{nd}$ Street, and the east-west roadways of A Street, B Street, and C Street. The system also includes a central controller 120 configured to correlate the traffic monitoring meta data received over communication paths 102' from the plurality of video units, and to form a composite representation of at least one geographic map and a representation of the correlated traffic monitoring meta data received from the plurality of video units. The figure shows traffic flow TF(1) on $1^{st}$ Street, traffic flow TF(2) on $2^{nd}$ Street, and traffic flow TF(3) on B Street. The figure shows traffic lights L1 and L1' at the intersection of B Street and $1^{st}$ Street and traffic lights L2 and L2' at the intersection of B Street and $2^{nd}$ Street. The traffic flow TF(3) on B Street is shown by its depicted heavier line to be greater in vehicles passing per unit time than the traffic flow TF(1) on $1^{st}$ Street or the traffic flow TF(2) on $2^{nd}$ Street. This is one on many ways to represent the volume of traffic as a heat map. Also color may be applied to represent traffic speed relative to the speed limit etc.

The central controller 120 includes a processor 122 comprising a dual central processor unit (CPU) or multi-CPU 124/125, a random access memory (RAM) 126 and read only memory (ROM) 128. The memories 126 and/or 128 include computer program code, including traffic monitoring software 130(A). A display device and graphical user interface may be connected to the central controller.

The central controller 120 includes a power line 140, radio communications 146, or other low bandwidth communications medium unit 140/146 that includes a transmit/receive (TX/RX) buffer 142/148 and a power line or other medium coupler 144 or radio. The radio or power line communications unit 140 is coupled to the plurality of video units 102(1), 102(2), 102(3), 102(4), 102(5), and 102(6) located in the geographic area of $1^{st}$ Street and $2^{nd}$ Street, and A Street, B Street, and C Street. The plurality of video units transmit traffic meta data characterizing an analysis of the traffic monitoring events analyzed by the video units, transmitting over radio or the power line communications path 102', which may be a power line operated as a low bandwidth communication link. Other examples of the low bandwidth communication path 102', include twisted pair, coax cable, Ethernet, radio media such as WiFi, Bluetooth, cellular, IEEE 802.15.4 RF at longer distances, Bluetooth Low Energy, ultra narrow band communications protocol from Sigfox, LTE-M, any Low Power Wireless Area Network (LPWAN) protocol, any M2M communication protocol and LoRa Low Power Wide Area Network. The example embodiment of the invention, is expected to work over low bandwidth communication links, however it is not restricted to low bandwidth and works over higher bandwidth communication links.

In accordance with an example embodiment of the invention, the central controller 120 is configured to store at least one geographic map or picture representing the at least one thoroughfare to be monitored. The central controller 120 is configured to correlate the traffic monitoring meta data received from the plurality of video units 102(1), 102(2), 102(3), 102(4), 102(5), and 102(6) and to form a composite representation of the at least one geographic map and a representation of the correlated traffic monitoring meta data received from the plurality of video units, as shown in FIG. 3A. The correlation of input meta data from multiple video units may be accomplished by image recognition of the vehicle type, manufacturer, color, features such as a moon roof, damage on the vehicle, license plate number etc, or any combination The central controller 120 includes a playback unit 135 configured to replay records of previously stored composite representations of the at least one geographic map and representations of the correlated traffic monitoring meta data, which were monitored under mutually different event conditions.

Figure 2:
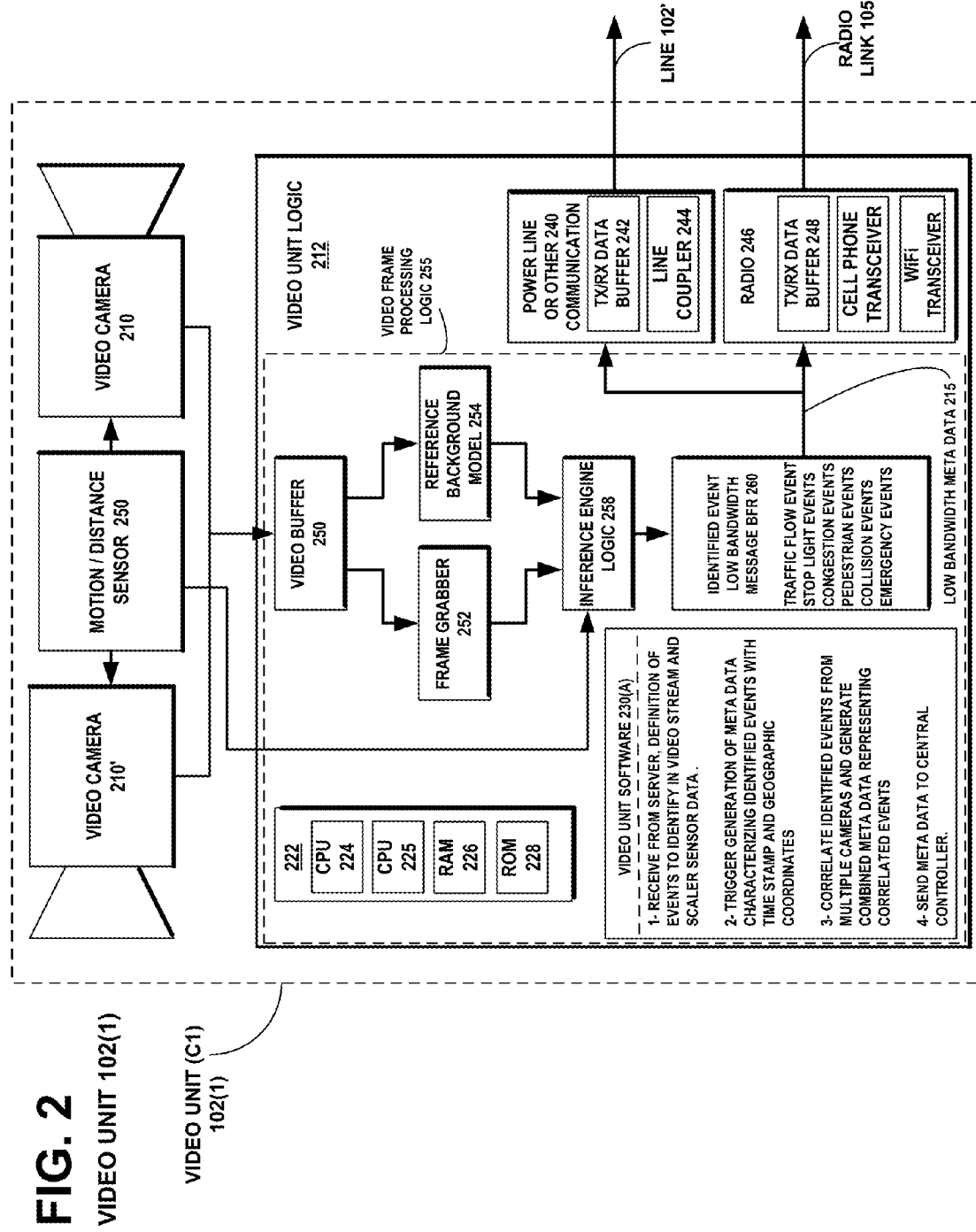
FIG. 2 illustrates an example embodiment of the invention, showing the at least one video unit located at the thoroughfare, including a video camera, video frame processing logic, a processor and memory including computer program code. The at least one video unit is configured to cause the video frame processing logic to process a video stream from the video camera while monitoring the traffic monitoring events at the thoroughfare specified by the central controller, to identify a traffic monitoring event associated with the thoroughfare, and to analyze the traffic monitoring event and to encode traffic meta data characterizing the analysis of the traffic monitoring event analyzed by the at least one video unit at the thoroughfare. The at least one video unit includes a communications unit configured to transmit the meta data characterizing analysis of the traffic monitoring event to the central controller.

FIG. 2 illustrates an example embodiment of the invention, showing the at least one video unit 102(1) located in the geographic area of $1^{st}$ Street and $2^{nd}$ Street, and A Street, B Street, and C Street. The video unit 102(1) includes a video camera 210, a second video camera 210' and video frame processing logic 255 comprising a video buffer 250, frame grabber 252, reference background model 254, and inference engine logic 258. The reference background model 254 is a program construct stored in the RAM 226, which is a learned model that characterizes and catalogs the detection and representation of objects in the background in various lighting, color temperature, shadow and other conditions.

The video cameras 210 and 210' comprise an image sensor plus a 3D sensor, including a red, green, blue (RGB) sensor plus an infrared (IR) sensor.

Figure 2A:
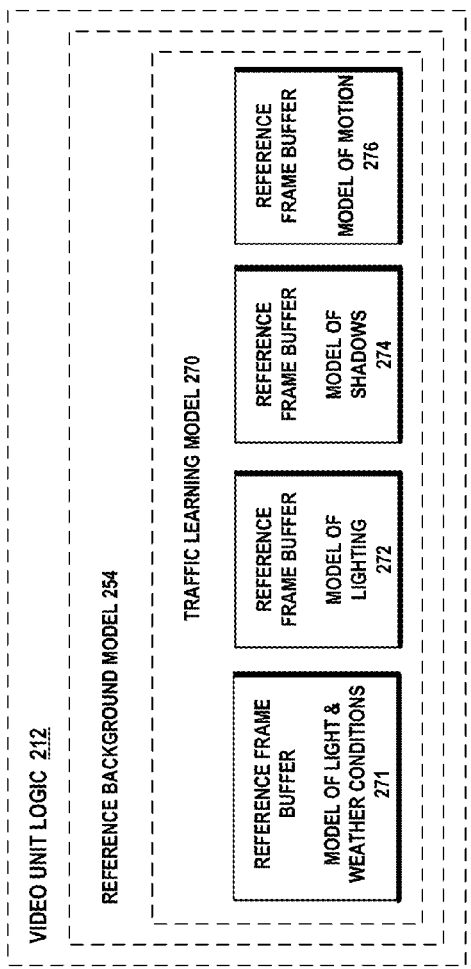
FIG. 2A illustrates an example embodiment of a reference background model in the at least one video unit.

The reference background model 254 shown in FIG. 2A, includes a traffic learning model 270, which includes, but is not limited to, multiple reference frame buffers for different light and weather conditions 271, a model of lighting 272, a model of shadows 274, and a model of motion 276.

For example, the model of light and weather conditions 271 takes as an input, the current time of day and the level of solar illumination on cloudy versus sunny days. The light and weather model 271 correlates, over time, the background light level illuminating the through-fare, based on the time of day and the level of solar illumination. The light and weather model 271 assigns a score to various background light levels. For a current time of day and the level of solar illumination, the light and weather model 271 provides the corresponding score to the inference engine 258, as one of the factors used by the inference engine in determining the occurrence of reportable event being monitored.

The video frame processing logic 255 processes the video stream from the video cameras 210 and 210' while monitoring the geographic area, to identify an event. The video unit 102(1) also includes a motion/distance sensor 250 that senses the motion and distance of objects, such as moving a car in the geographic area and triggers the video cameras 210 and/or 210' to turn on. The motion/distance sensor 250 inputs event signals for detected motion and distance to the inference engine logic 258.

Figure 2B:
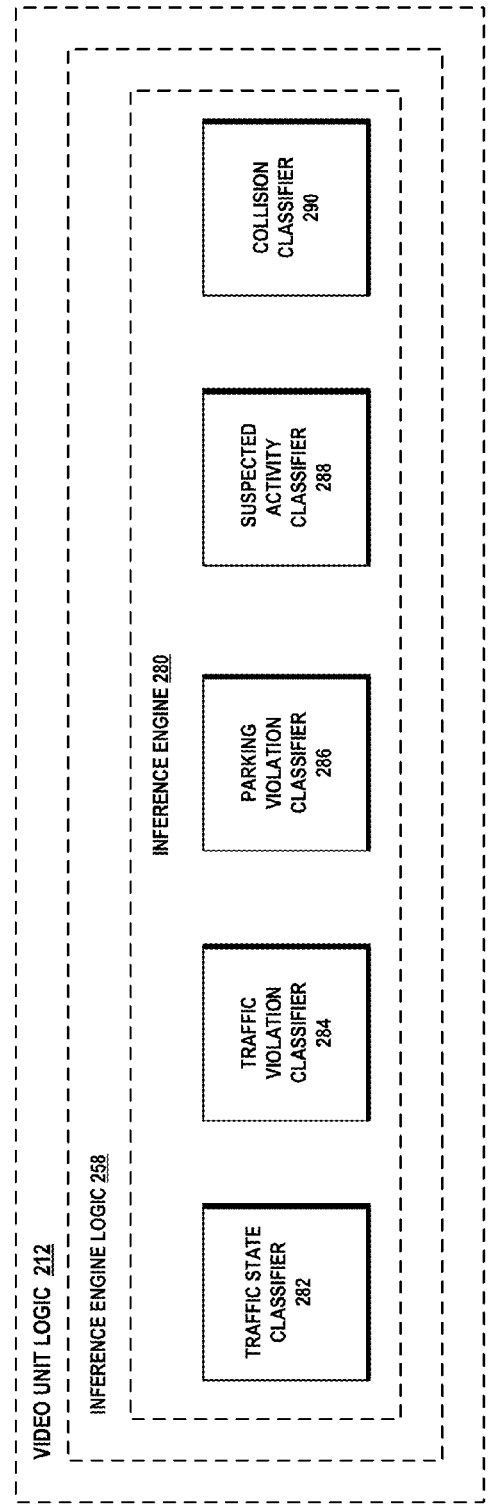
FIG. 2B illustrates an example embodiment of an inference engine logic in the at least one video unit.

The inference engine logic 258 shown in FIG. 2B, comprises an inference engine 280, which includes, but is not limited to, multiple classifiers. Examples of classifiers are: 1. traffic state classifier 282; 2. traffic violation classifier 284; 3. parking violation classifier 286; 4. Suspected activity classifier 288; and 5. Collision classifier 290. The inference engine logic 258 is a program construct stored in the RANI 226. The inference engine logic 258 outputs traffic monitoring meta data that identifies a traffic monitoring event associated with the geographic area. The inference engine logic 258 analyzes the traffic monitoring event and to encodes traffic meta data characterizing the analysis of the traffic monitoring event. Examples of meta data output by the inference engine logic 258 includes the following:

number of vehicles time stamps location (GPS coordinates, address, etc.)

classifications (car motorcycle, bus, truck, limo etc.)

lane occupancy flow per lane speed of each object (car, truck etc.)

average speed—collect information on the average speed of vehicles passing through a road way (separated by vehicle classification type if required).

color search—perform an color based search of people or vehicles, to quickly find suspicious objects after an event has occurred.

exportable CSV—Export event information, including vehicle speeds, monitors, and classification data, to share with partners or ingest into other tools.

no exit—detect if a car has parked and no one has left the vehicle. This is useful to detect suspicious activity pedestrian activity—detect when pedestrians are too close to the roadway or gathering on the side of the road.

pedestrian crosswalk safety and monitoring—monitor pedestrians as they walk along sidewalks or crosswalks, ensure pedestrian safety, or detect when people jaywalk, etc.

person/vehicle classification—effortlessly set up classification to detect between people and vehicles, and then more closely classify between vehicle types—cars, trucks, motorcycles, and more.

smoke/fire detection—visually detect if a fire has occurred in the monitored through-fare area. Standard smoke and fire detectors do not work well outdoors, a visual detector may send a notification right away.

speeding vehicle—detect and provide information about vehicles speeding through traffic scenes. Speeding vehicles are unsafe, but can be hard to catch.

stopped vehicle—detect a vehicle idling in a suspicious location, whether they have broken down or are illegally parked.

track summaries—after-the-fact review track summaries and snapshots of people or vehicles as they move through the scene. Search for tracks based on location, color, and classification.

traffic heat map—generate a heat map to see an overview of traffic information and provide intuitive demonstration tools for presentations (heat map: a graphical representation of data where the individual values contained in a matrix are represented as colors)

turn monitor—monitor vehicles following specific tracks through the roadway. Differentiate the monitors between where vehicles came from and where they turned.

vehicle classification: truck, car, motorcycle that is combined with other event types, including speed, monitoring, idling objects, and more.

vehicle monitoring—monitor vehicles as they pass through the scene.

wrong way—detect vehicles or people going against the flow of traffic.

For example, the traffic state classifier 282, which is an artificial intelligence (AI) component, applies a sequence of IF-THEN rules to a knowledge base of data, such as the dimensions of a particular traffic and standards. The traffic learning model factors 270, such as the score received from the light and weather model 271, are used in analyzing the current video frame received from the frame grabber 252, to derive a measurement of the current flow of traffic. The measurement of the current flow of traffic is then compared to standards of traffic flow, using the IF-THEN rules. If the measurement of the current level of traffic flow is less than a certain value, then the inference engine logic 258 outputs a "acceptable traffic flow" indication as the identified event, which is encoded as a low bandwidth event message 215 and transmitted by the video unit 102(1) to the controller 120. Alternately, if the measurement of the current level of traffic flow is so great as to be excessive, then the inference engine logic 258 outputs an "excessive traffic flow" indication as the identified event, which is encoded as a low bandwidth event message and transmitted by the video unit 102(1) to the controller 120. The traffic state classifier 282 may detect the traffic flow events over a time period at a video unit 102(1) and send a series of meta data messages back to the central server 120 about them.

The video unit 102(1) is configured to encode a low bandwidth message characterizing the event. The video unit 102(1) includes a power line or other low bandwidth medium communications unit 240 that includes a transmit/receive (TX/RX) buffer 242 and a power line or other low bandwidth medium coupler 244, configured to transmit the low bandwidth message to the management controller 120 over power line or other low bandwidth medium 102'. In an alternate embodiment, the video unit 102(1) includes a radio unit 246 that includes a transmit/receive (TX/RX) buffer 248, a cell phone transceiver, and a WiFi transceiver, which are configured to transmit the low bandwidth message to the management controller 120 over a radio link 105.

The video unit 102(1) includes a processor 222 comprising a dual central processor unit (CPU) or multi-CPU 224/225, a random access memory (RAM) 226 and read only memory (ROM) 228. The memories 226 and/or 228 include computer program code, including video unit software 230(A). The example embodiment of the invention, is expected to work over low bandwidth communication links, however it is not restricted to low bandwidth and works over higher bandwidth communication links.

The video unit software 230(A) includes example instructions such as the following:

1—receive from server, definition of events to identify in video stream and scalar sensor data.

2—trigger generation of meta data characterizing identified events with time stamp and geographic coordinates 3—correlate identified events from multiple cameras and generate combined meta data representing correlated events 4—send meta data to central controller.

The identified event low bandwidth message buffer 260 may include example meta data messages 215, such as: traffic flow event, stop light events, congestion events, pedestrian events, collision events, and emergency events.

Figure 2C:
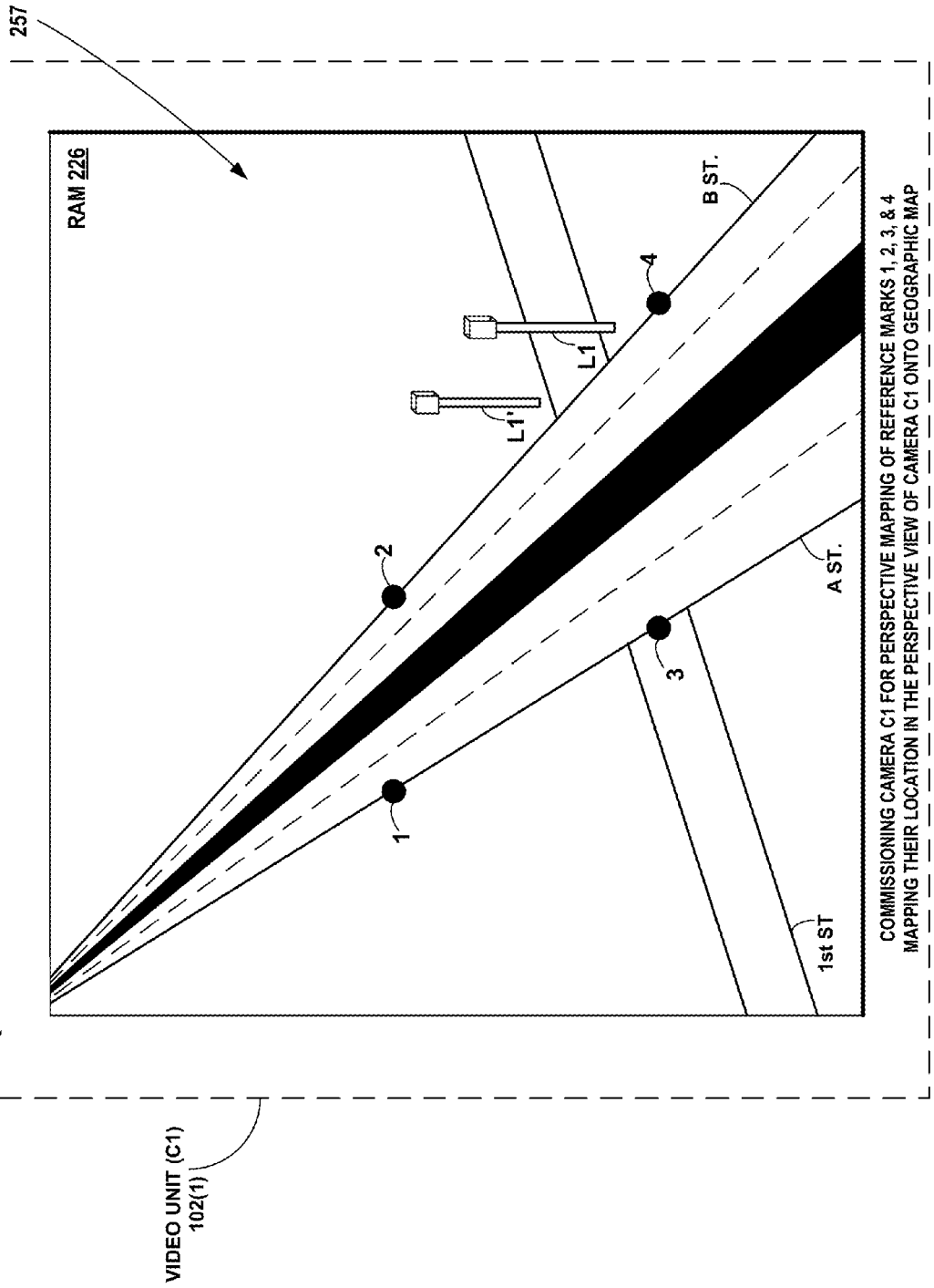
FIG. 2C illustrates an example embodiment of the invention, showing an initial step in commissioning a traffic monitoring video camera for perspective mapping from a perspective view of the camera viewing a roadway, onto geographic map of the roadway. The figure shows a memory image in a memory associated with the video camera, of the perspective view of the roadway to be monitored.

FIG. 2C illustrates an example embodiment of the invention, showing an initial step in commissioning a traffic monitoring video camera C1 102(1) for perspective mapping from a perspective view of the camera viewing a roadway, onto geographic map of the roadway. The figure shows a memory image 257 in a memory 226 associated with the video camera C1 102(1), of the perspective view of the roadway to be monitored. The figure shows identifying, by the video camera, reference locations 1, 2, 3, and 4 with respect to the roadway, in the memory image of the camera's perspective view. This may be done by the user designating the locations with a mouse or other graphical user interface (GUI) pointing device. For example, the user may select, for example, four matching reference points (more the better) to create a perspective transformation between camera view and the map. For example, reference mark or point 3 is selected at the intersection of 1st Street and A Street.

FIG. 2D illustrates an example embodiment of the invention of FIG. 2C, showing a subsequent step in commissioning the traffic monitoring video camera C1 102(1). The figure shows a memory image 259 in the memory associated with the video camera, of a geographic map of the roadway to be monitored. The figure shows forming a mapping relationship between the identified reference locations 1, 2, 3, and 4 in the camera's perspective view of the roadway in FIG. 2C, with geographic coordinates of the geographic map in FIG. 2D, corresponding to the reference locations. For example, automatically, given a street view, an automatic correlation may be done of point between camera view and map view to create a perspective transformation. In an example embodiment, reference mark or point 3 was selected by the user to be at the intersection of 1st Street and A Street in FIG. 2C. A geographic map view of the intersection of 1st Street and A Street may be automatically correlated in a digital map, with the geographic coordinates of the intersection of 1st Street and A Street, the correlation establishing the mapping relationship.

FIG. 2E illustrates an example embodiment of the invention of FIG. 2D, showing an initial step in monitoring vehicle motion using the mapping relationship. The figure shows a memory image 261 in the memory associated with the video camera C1 102(1), of the perspective view of a vehicle moving along the roadway to be monitored. The figure shows mapping the motion of the image of the vehicle pixels P1 and P2 at two consecutive locations, as seen in the camera, mapped onto geographic map coordinates of the moving vehicle on the geographic map. Give a perspective transform we use the base of the detected vehicle to estimate its position on the road. For example, use the mapping between pixel motion in camera to map coordinates to estimate vehicle speeds.

FIG. 2F illustrates an example embodiment of the invention of FIG. 2E, showing a subsequent step in monitoring the vehicle motion using the mapping relationship. The figure shows a memory image 263 in the memory associated with the video camera C1 102(1), of the geographic map of the roadway with the geographic map coordinates LOC. PIXEL P1 and LOC. PIXEL P2 of the moving vehicle. Characteristics of the vehicle's motion, such as its speed, may be derived from its map coordinates.

In an example embodiment of the invention, given different views and their mapping on the map, different views may be stitched together, even when the views do not overlap. Stitched views may be used to track vehicles, track paths for better traffic management.

In an example embodiment of the invention, multiple sensors may be used, such as multiple cameras or laser range finders or any other 3D mapper, to have a better estimate of the vehicles, their sizes, motion and tilt etc. This also allows removal of errors caused by a birds flying by.

Figure 2G:
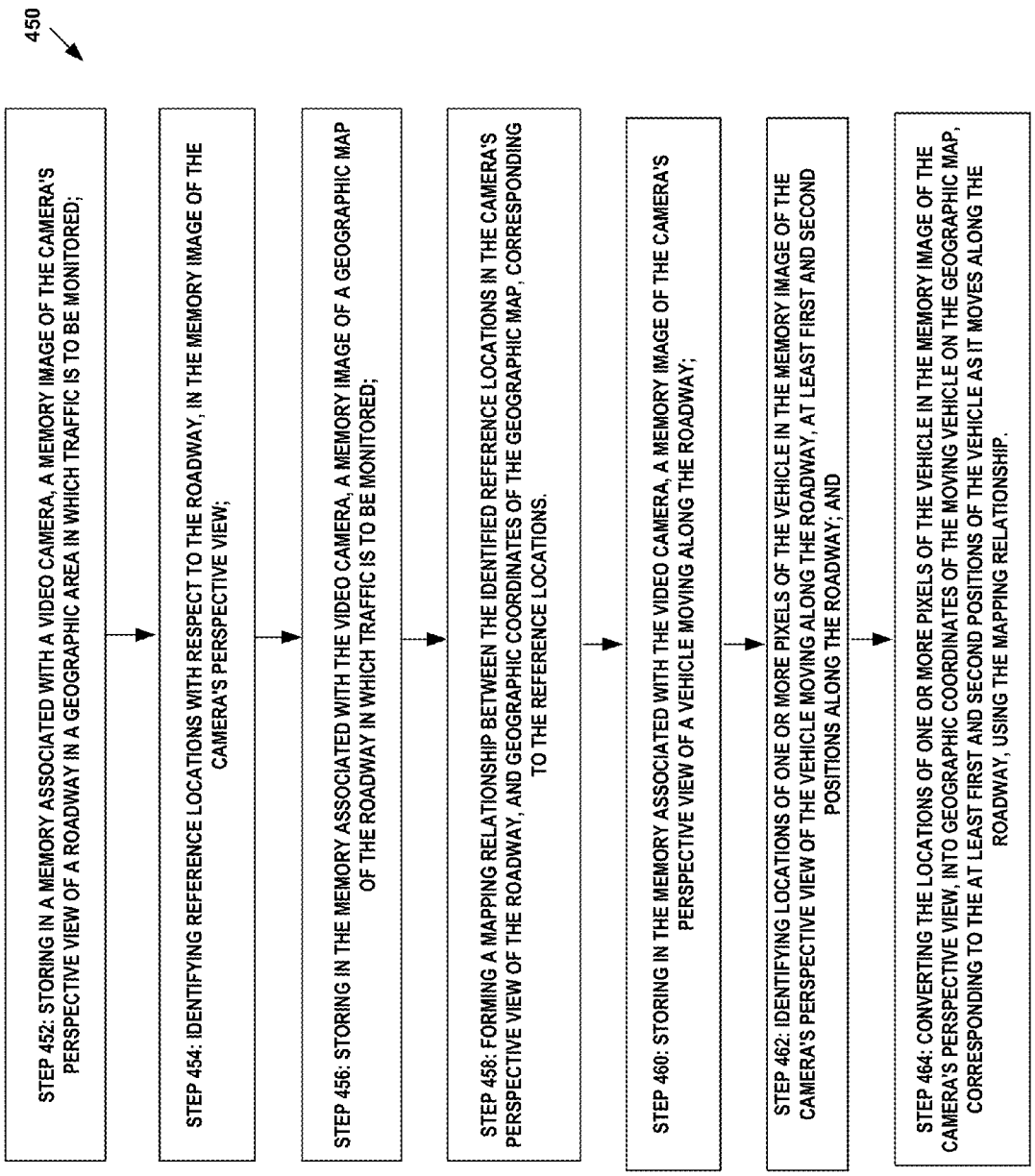
FIG. 2G illustrates an example embodiment of the invention, showing a flow diagram of an example process to commission a traffic monitoring video camera.

FIG. 2G illustrates an example embodiment of the invention, showing a flow diagram 450 of an example process to commission a traffic monitoring video camera and using the camera to monitor a vehicle. The steps of the flow diagram represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 452: storing in a memory associated with a video camera, a memory image of the camera's perspective view of a roadway in a geographic area in which traffic is to be monitored;

Step 454: identifying reference locations with respect to the roadway, in the memory image of the camera's perspective view;

Step 456: storing in the memory associated with the video camera, a memory image of a geographic map of the roadway in which traffic is to be monitored;

Step 458: forming a mapping relationship between the identified reference locations in the camera's perspective view of the roadway, and geographic coordinates of the geographic map, corresponding to the reference locations.

Step 460: storing in the memory associated with the video camera, a memory image of the camera's perspective view of a vehicle moving along the roadway;

Step 462: identifying locations of one or more pixels of the vehicle in the memory image of the camera's perspective view of the vehicle moving along the roadway, at least first and second positions along the roadway; and Step 464: converting the locations of one or more pixels of the vehicle in the memory image of the camera's perspective view, into geographic coordinates of the moving vehicle on the geographic map, corresponding to the at least first and second positions of the vehicle as it moves along the roadway, using the mapping relationship.

Figure 3:
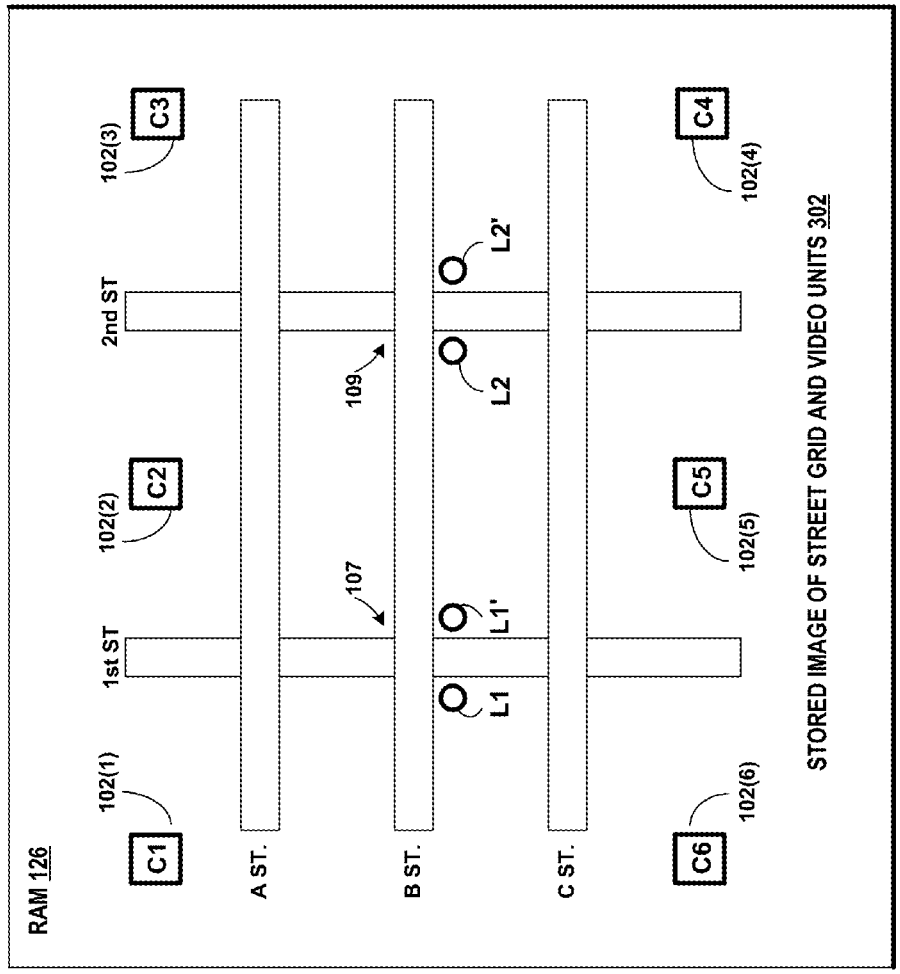
FIG. 3 illustrates an example embodiment of the invention, showing a memory of the central controller containing a stored image of a street grid in a geographic map and the relative location of video unit icons of the distributed system.
Figure 3A:
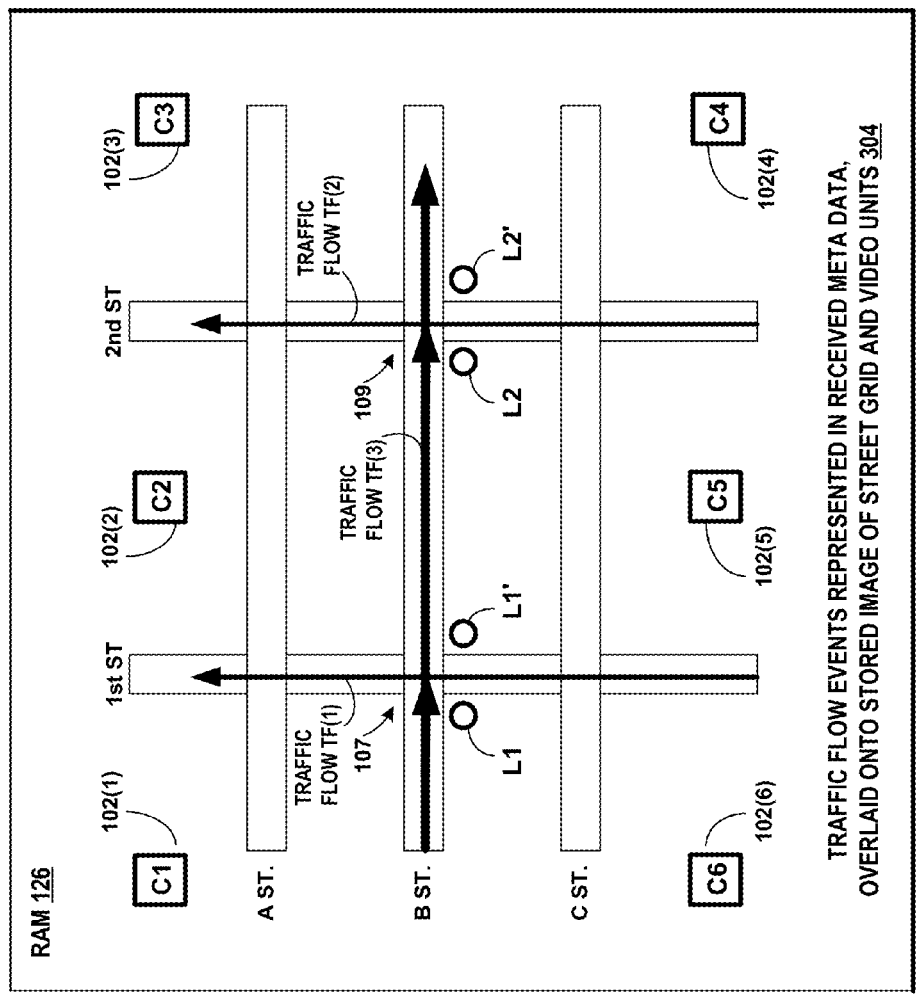
FIG. 3A illustrates an example embodiment of the memory of the central controller shown in FIG. 3, showing traffic flow events represented in correlated traffic monitoring meta data received from the plurality of video units, overlaid onto the stored image of the street grid and video unit icons.
Figure 3A:
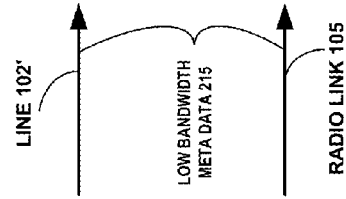

FIG. 3 illustrates an example embodiment of the invention, showing a memory 126 of the central controller 120 containing a stored image of the street grid in FIG. 1, in a geographic map 302 and the relative location of icons of the video units 102(1) C1, 102(2) C2, 102(3) C3, 102(4) C4, 102(5) C5, and 102(6) C6 of the distributed system. Also shown is the relative location of icons representing of traffic lights L1, L1', L2 and L2'

FIG. 3A illustrates an example embodiment of the memory of the central controller shown in FIG. 3, showing traffic flow event TF(1) on $1^{st}$ Street, traffic flow event TF(2) on $2^{nd}$ Street, and traffic flow event TF(3) on B Street, as represented in an overlay 304 of correlated traffic monitoring meta data received from the plurality of video units, overlaid onto the stored image of the street grid of the geographic map 302 and video unit icons. This information may be displayed to a user or output as a printed report. Additional information is available, weather conditions, night or day or overcast along with calculated or derived through artificial intelligence (AI) algorithms, which may be represented in tabular form on the map or by clicking various intersection locations. For example, click on the intersection of B Street and $1^{st}$ Street and a pop-up may show you the average wait times at the traffic light for vehicles at this intersection north-south, east-west, etc. Other information presented may provide peak vehicle flow per minute or hour or day etc. Also vehicle flow and speed trends may be presented.

Figure 3B:
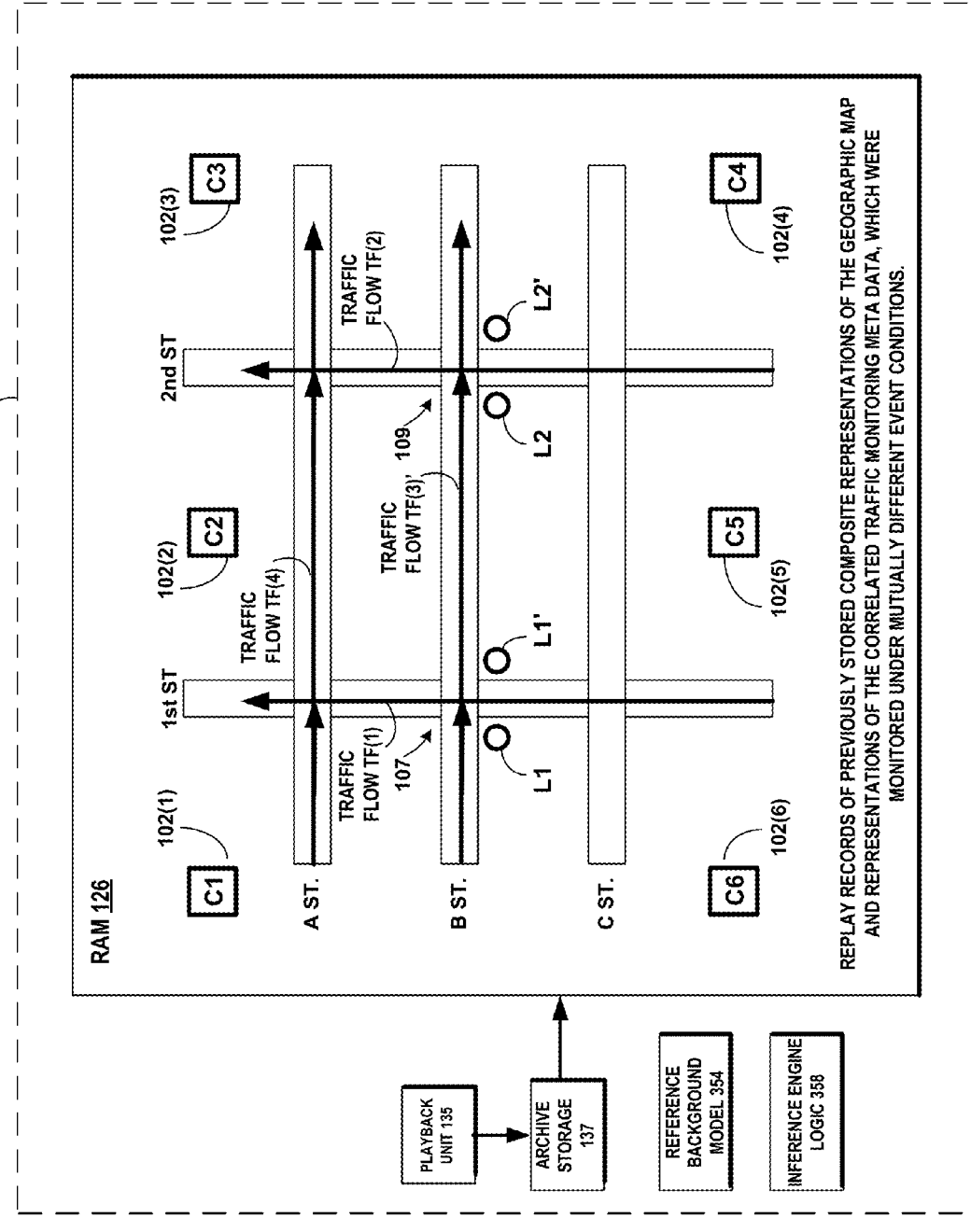
FIG. 3B illustrates an example embodiment of the memory of the central controller shown in FIG. 3A, and a playback unit configured to replay records of previously stored composite representations of the geographic map and representations of the correlated traffic monitoring meta data, which were monitored under mutually different event conditions.
Figure 3C:
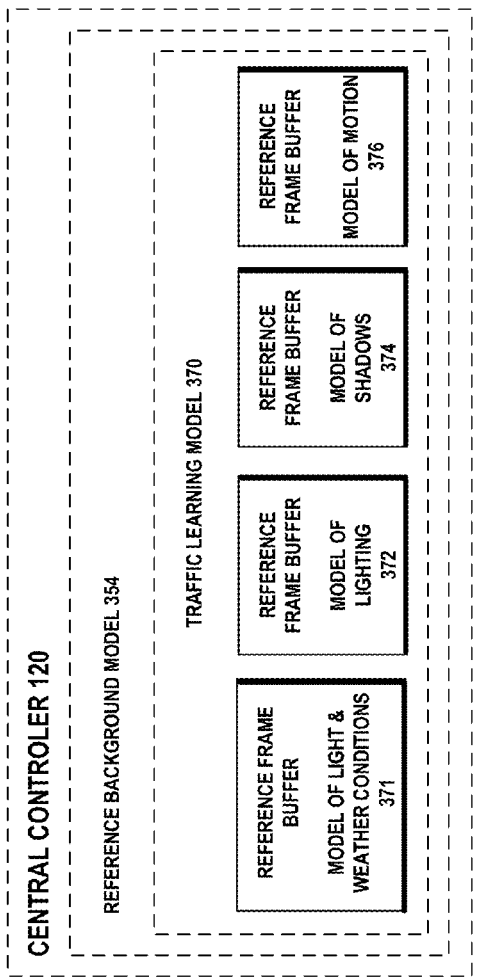
FIG. 3C illustrates an example embodiment of a reference background model in the central controller.

FIG. 3B illustrates an example embodiment of the memory of the central controller shown in FIG. 3A, and a playback unit configured to replay records of previously stored composite representations of the geographic map and representations of the correlated traffic monitoring meta data, which were monitored under mutually different event conditions. In the example playback shown, the traffic flow event TF(3) on B Street has been reconfigured in a "what-if" analysis, to divide the traffic flow between B Street and A Street, so that B Street has a lower traffic flow of TF(3)' and A Street now has a traffic flow of TF(4). The resulting new "what-if" information calculated or derived through AI algorithms may also be displayed to a user or output as printed report. Additional information which may be represented in tabular form on the map or by clicking various intersection locations. For example, click on the intersection of B Street and $1^{st}$ Street and a before-and-after pop-up may show the user the average wait times at the traffic light for vehicles at this intersection north-south, east-west, etc. Other before-and-after information presented may provide peak vehicle flow per minute or hour or day etc. Also vehicle flow and speed trends may be presented. In addition each parameter may be made variable, so it may be changed and the simulation re-run again. Changes may include access to reference models 270 to change things such as lighting or weather conditions, or the removal of a vehicle obstructing traffic, etc, In an example embodiment of the invention, the central controller 120 includes artificial intelligence (AI) components to enable simulation of changes to environmental factors or events and the meta data replayed as a simulation of the original events. The central controller 120 includes a reference background model 354 shown in FIG. 3C and an inference engine logic 358 shown in FIG. 3D.

The central controller 120 includes a traffic learning model 370, which includes, but is not limited to, multiple reference frame buffers for simulation of different light and weather conditions 371, a model of simulation of lighting 372, a model of simulation of shadows 374, and a model of simulation of motion 376.

For example, the model of light and weather conditions 371 takes as an input, the simulation of time of day and the simulation of level of solar illumination on cloudy versus sunny days. The light and weather model 371 correlates, over time, the simulation of background light level illuminating the through-fare, based on the simulation of time of day and the simulation of level of solar illumination. The light and weather model 371 assigns a score to various simulation background light levels. For a simulation of time of day and simulation of level of solar illumination, the light and weather model 371 provides the corresponding score to the inference engine 358, as one of the factors used by the inference engine in determining the occurrence of simulation event being monitored.

Figure 3D:
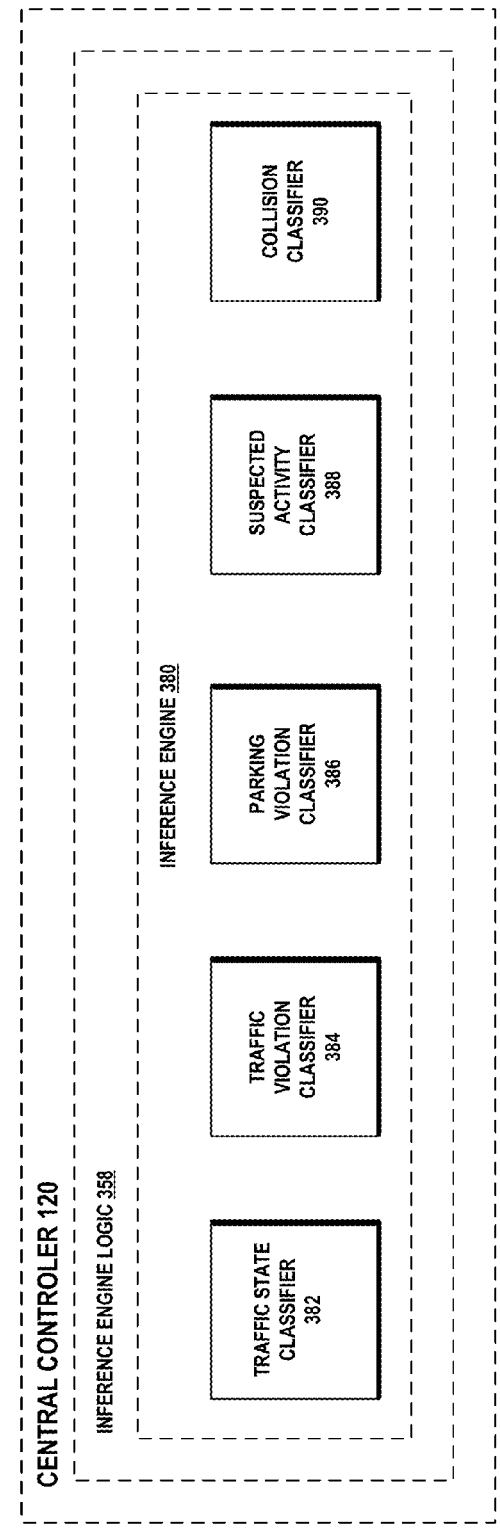
FIG. 3D illustrates an example embodiment of an inference engine logic in the central controller.

The central controller 120 includes an inference engine logic 358 shown in FIG. 3D, comprises an inference engine 380, which includes, but is not limited to, multiple classifiers. Examples of classifiers are: 1. traffic state classifier 382; 2. traffic violation classifier 384; 3. parking violation classifier 386; 4. Suspected activity classifier 388; and 5. Collision classifier 390. The inference engine logic 358 is a program construct stored in the RAM 126. The inference engine logic 358 outputs simulation of traffic monitoring meta data that identifies a simulation of traffic monitoring event associated with the geographic area. The inference engine logic 358 analyzes the simulation of traffic monitoring event and presents the simulated result to the user, for example on a display device coupled to the central controller 120.

The user may change various factors influencing the original events to gauge how the simulated events may change as a result. For example, the simulation of the time-of-day may be changed from daytime to nighttime by accessing the lighting model 372 in the central controller 120. As another example, the simulation of traffic volume may be changed from moderate traffic flow to heavy traffic flow by accessing the traffic state identifier 382 in the central controller 120. The artificial intelligence (AI) components enable simulation of changing timing of traffic lights, replacing traffic lights with roundabouts, changing traffic flows, changing the direction or magnitude of traffic flow, widening the road, adding another road to spread out traffic, changing stop signs to traffic lights, making streets one-way, changing ambient weather conditions, changing street intersections, simulating nighttime, simulating daytime, or simulating vehicle activities.

FIG. 4 illustrates an example embodiment of the invention, showing a system flow diagram 400 of an example the operation of the central controller.

The steps of the flow diagram 400 represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 402: store at least one geographic map representing at least one thoroughfare to be monitored;

Step 404: correlate traffic monitoring meta data received from a plurality of video units viewing the at least one thoroughfare;

Step 406: form a composite representation of the at least one geographic map and a representation of the correlated traffic monitoring meta data received from the plurality of video units;

Step 408: store a plurality of records of the composite representations of the at least one geographic map and representations of the correlated traffic monitoring meta data, each of the plurality of records corresponding to the at least one thoroughfare being monitored under mutually different event conditions; and Step 410: replay a sub-plurality of the a plurality of records of the composite representations of the at least one geographic map and representations of the correlated traffic monitoring meta data, monitored under mutually different event conditions.

Step 412: access artificial intelligence (AI) models and/or classifiers to simulate effects of changing event conditions.

In an example embodiment of the invention, the traffic state classifier 282 in the video unit 102(1), may detect the traffic flow events over a time period and send a series of meta data messages describing them back to the central controller 120. This meta data may be replayed at the central controller as a simulation of the original events and to simulate variations in the original events in a what-if analysis.

In an example embodiment of the invention, at the central controller 120, simulated changes may be made to environmental factors or events and the meta data replayed as a simulation of the original events. The user may change various factors influencing the original events to simulate how the simulated events may change as a result. For example, the simulation of the time-of-day may be changed from daytime to nighttime by accessing the lighting model in the central controller 120. As another example, the simulation of traffic volume may be changed from moderate traffic flow to heavy traffic flow by accessing the traffic state identifier in the central controller 120.

In an example embodiment of the invention, the central controller may include artificial intelligence (AI) components to enable simulation of changes to environmental factors or events and the meta data replayed as a simulation of original events. The artificial intelligence (AI) components may include a reference background model and an inference engine logic. The artificial intelligence (AI) components may enable simulation of weather changes, street intersections, street roundabouts, nighttime, daytime, changing the direction or magnitude of traffic flow, widening the road, adding another road to spread out traffic, changing timing of traffic lights, changing stop signs to traffic lights, making streets one-way, or vehicle activities. The artificial intelligence (AI) components may enable combining the meta data directly from the video unit with simulation of changes to environmental factors or events to do what-if investigations.

The processing involved with replay of events at an intersection or monitored roadway or the simulation of changes to events can be done faster than real time. For example the central controller process the activity in a month long video in seconds.

Although specific example embodiments of the invention have been disclosed, persons of skill in the art will appreciate that changes may be made to the details described for the specific example embodiments, without departing from the spirit and the scope of the invention.

What is claimed is:

1. A distributed system for traffic monitoring and event detection, comprising:

a plurality of video units located within viewing distance of at least one thoroughfare to be monitored, each video unit including a video camera, video frame processing logic, a processor and memory including computer program code configured to cause the video frame processing logic to process a video stream from at least one video camera while monitoring predefined categories of events at the at least one thoroughfare, to identify traffic monitoring events associated with the at least one thoroughfare, to analyze the traffic monitoring events, and to encode traffic meta data characterizing the analysis of the traffic monitoring events, each video unit including a communications unit configured to transmit to a central controller the meta data characterizing analysis of the traffic monitoring events;

a central controller, including a processor and memory including computer program code configured to cause the central controller store at least one geographic map representing the at least one thoroughfare to be monitored, to cause the controller to correlate the traffic monitoring meta data received from the plurality of video units, and to cause the controller to form a composite representation of the at least one geographic map and a representation of the correlated traffic monitoring meta data received from the plurality of video units; and the central controller including an archive storage configured to store a plurality of records of the composite representations of the at least one geographic map and representations of the correlated traffic monitoring meta data, each of the plurality of records corresponding to the at least one thoroughfare being monitored under mutually different event conditions.

2. The system of claim 1, further comprising:
the central controller including a playback unit configured to replay a sub-plurality of the a plurality of records of the composite representations of the at least one geographic map and representations of the correlated traffic monitoring meta data, monitored under mutually different event conditions.

3. The system of claim 2, wherein the mutually different event conditions include changing timing of traffic lights, replacing traffic lights with roundabouts, changing traffic flows, changing the direction or magnitude of traffic flow, widening the road, adding another road to spread out traffic, changing stop signs to traffic lights, making streets one-way, or changing ambient weather conditions.

4. The system of claim 1, further comprising:
the communications unit in the at least one video unit being configured to transmit the low bandwidth event message to the central controller over a communications medium selected from the group consisting of twisted pair, coax cable, Ethernet, WiFi, Bluetooth, cellular, IEEE 802.15.4 RF, Bluetooth Low Energy, ultra narrow band communications protocol from Sigfox, LTE-M, any Low Power Wireless Area Network (LPWAN) protocol, any M2M communication protocols or LoRa Low Power Wide Area Network; and
the central controller including a communications unit configured to receive the low bandwidth event message from the at least one video unit over the communications medium.

5. The system of claim 1, further comprising:
the communications unit in the at least one video unit being a power line communications unit configured to transmit a low bandwidth event message over installed power lines to the central controller;
the central controller including a communications unit being a power line communications unit, configured to receive the low bandwidth event message over installed power lines from the at least one video unit; and
the power line communications unit in the central controller further configured to transmit or receive data communications over installed power lines to electrically powered devices in the thoroughfare where power is needed and control desired.

6. The system of claim 1, further comprising:
a sensor located at the at least one video unit, configured to sense distance and motion of a vehicle, the at least one video unit, configured to prepare a low bandwidth event message representing the vehicle's position and motion sensed by the sensor.

7. The system of claim 1, further comprising:
a plurality of video cameras located at the at least one video unit, configured to analyze and combine multiple views of a same event and only send a reduced amount of information to the central controller, the at least one video unit, configured to prepare a low bandwidth event message representing the reduced amount of information.

8. The system of claim 1, further comprising:
the central controller including artificial intelligence (AI) components to enable simulation of changes to environmental factors or events and the meta data replayed as a simulation of original events.

9. The system of claim 8, wherein the artificial intelligence (AI) components include a reference background model and an inference engine logic.

10. The system of claim 8, wherein the artificial intelligence (AI) components enable simulation of changing timing of traffic lights, replacing traffic lights with roundabouts, changing traffic flows, changing the direction or magnitude of traffic flow, widening the road, adding another road to spread out traffic, changing stop signs to traffic lights, making streets one-way, changing ambient weather conditions, changing street intersections, simulating nighttime, simulating daytime, or simulating vehicle activities.

11. The system of claim 8, wherein meta data directly from the video unit are combined with simulation of changes to environmental factors or events to do what-ifs investigations.

12. A method for traffic monitoring and event detection, comprising:
processing a video stream from at least one video camera in a video unit while monitoring predefined categories of events at an at least one thoroughfare, to identify traffic monitoring events associated with the at least one thoroughfare, to analyze the traffic monitoring events, and to encode traffic meta data characterizing the analysis of the traffic monitoring events, the at least one video unit including a communications unit configured to transmit to a central controller the meta data characterizing analysis of the traffic monitoring events;
storing at least one geographic map representing the at least one thoroughfare to be monitored, correlating the traffic monitoring meta data received from a plurality of video units, and forming a composite representation of the at least one geographic map and a representation of the correlated traffic monitoring meta data received from the plurality of video units;
storing a plurality of records of the composite representations of the at least one geographic map and representations of the correlated traffic monitoring meta data, each of the plurality of records corresponding to the at least one thoroughfare being monitored under mutually different event conditions; and
replaying a sub-plurality of the a plurality of records of the composite representations of the at least one geographic map and representations of the correlated traffic monitoring meta data, monitored under mutually different event conditions.

* * * * *